United States Patent
Knoedgen et al.

(10) Patent No.: US 10,439,528 B2
(45) Date of Patent: Oct. 8, 2019

(54) ACTUATOR WITH INHERENT POSITION SENSOR

(71) Applicant: Dialog Semiconductor (UK) Limited, London (GB)

(72) Inventors: Horst Knoedgen, Munich (DE); Horst Schleifer, Kircheim unter Teck (DE)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/104,494

(22) Filed: Aug. 17, 2018

(65) Prior Publication Data
US 2019/0058423 A1 Feb. 21, 2019

(30) Foreign Application Priority Data

Aug. 18, 2017 (DE) .......................... 10 2017 214 474

(51) Int. Cl.
*G03B 13/36* (2006.01)
*H02P 6/185* (2016.01)
(Continued)

(52) U.S. Cl.
CPC .............. *H02P 6/185* (2013.01); *G03B 13/36* (2013.01); *H02K 29/12* (2013.01);
(Continued)

(58) Field of Classification Search
CPC .. H02P 6/006; H02P 6/185; H02P 6/32; H02P 25/034; H02P 25/06;
(Continued)

(56) References Cited

U.S. PATENT DOCUMENTS

| | | | |
|---|---|---|---|
| 5,223,771 A * | 6/1993 | Chari | ...................... H02P 6/182 318/400.09 |
| 6,081,112 A | 6/2000 | Carobolante et al. | |

(Continued)

FOREIGN PATENT DOCUMENTS

DE    10 2005 028 856    1/2007

OTHER PUBLICATIONS

German Office Action, File No. 10 2017 214 474.2, Applicant: Dialog Semiconductor (UK) Limited, dated Jul. 19, 2018,10 pages, and English language translation, 11 pages.
(Continued)

*Primary Examiner* — William R Alexander
(74) *Attorney, Agent, or Firm* — Saile Ackerman LLC; Stephen B. Ackerman

(57) ABSTRACT

An actuation system is proposed for an optical system, comprising a voice coil motor for actuating the optical system, the voice coil motor comprising a magnet and an electric coil, a position measuring unit for measuring the position of the electric coil and providing a position feedback signal, and a control unit for closed loop control of the position of the optical system based on a target position and the position feedback signal, used for generating a drive signal for the electric coil. According to the disclosure, a ferromagnetic element is arranged in proximity to the electric coil so that the inductance of the electric coil depends on its position. Further, the position-measuring unit measures the inductance of the electric coil and determines the position of the electric coil based on the determined inductance.

25 Claims, 12 Drawing Sheets

(51) Int. Cl.
*H02K 29/12* (2006.01)
*H02K 41/035* (2006.01)
*H02P 6/00* (2016.01)
*G03B 5/00* (2006.01)
*G03B 3/10* (2006.01)

(52) U.S. Cl.
CPC ......... *H02K 41/0356* (2013.01); *H02P 6/006* (2013.01); *G03B 3/10* (2013.01); *G03B 5/00* (2013.01); *G03B 2205/0069* (2013.01); *H02P 2203/11* (2013.01)

(58) Field of Classification Search
CPC ..... H02P 2203/11; H02P 6/182; H02K 11/20; H02K 11/215; H02K 11/22; H02K 11/225; H02K 29/12; H02K 41/02; H02K 41/03; H02K 41/0352; H02K 41/0354; H02K 41/0356; G03B 5/00; G03B 13/36; G03B 2205/0069; G03B 13/10; G03B 13/32; G03B 13/34; G02B 7/02; G02B 7/023; G02B 7/09; G02B 7/10; G02B 7/28; G02B 7/282; H04N 5/225; H04N 5/2254; H04N 5/2328; H04N 5/23287
USPC ....... 359/554, 557, 694–704, 814, 823, 824; 310/12.14, 12.16; 318/135, 647, 685, 318/687; 396/72, 75, 77, 79, 80, 82, 85; 381/400

See application file for complete search history.

(56) References Cited

U.S. PATENT DOCUMENTS

| | | | | |
|---|---|---|---|---|
| 6,204,629 | B1 | 3/2001 | Rote et al. | |
| 6,479,954 | B1 | 11/2002 | Peritore et al. | |
| 6,650,082 | B1* | 11/2003 | Du | H02P 6/22 |
| | | | | 318/701 |
| 7,466,095 | B1* | 12/2008 | Chui | G11B 5/5526 |
| | | | | 318/254.1 |
| 8,084,969 | B2* | 12/2011 | David | G01D 5/145 |
| | | | | 318/135 |
| 8,716,959 | B2* | 5/2014 | David | G01D 5/145 |
| | | | | 318/135 |
| 9,784,594 | B2* | 10/2017 | David | G01D 5/145 |
| 10,136,040 | B2* | 11/2018 | Topliss | G02B 7/09 |
| 2002/0196577 | A1* | 12/2002 | Harmer | G11B 5/54 |
| | | | | 360/78.06 |
| 2004/0124799 | A1* | 7/2004 | Tanner | G11B 19/20 |
| | | | | 318/471 |
| 2007/0279797 | A1* | 12/2007 | Hansen | G11B 5/5547 |
| | | | | 360/78.14 |
| 2011/0068884 | A1* | 3/2011 | Brooks | H01F 7/1607 |
| | | | | 335/100 |
| 2015/0069939 | A1 | 3/2015 | Khan et al. | |
| 2015/0229814 | A1 | 8/2015 | Macours et al. | |
| 2016/0050497 | A1 | 2/2016 | Daubigny | |
| 2016/0164446 | A1 | 6/2016 | Conrad et al. | |
| 2017/0118408 | A1 | 4/2017 | Gregory et al. | |
| 2017/0155896 | A1 | 6/2017 | Malaescu et al. | |
| 2017/0346999 | A1* | 11/2017 | Topliss | G02B 7/09 |
| 2018/0146130 | A1* | 5/2018 | Lee | G03B 5/00 |
| 2018/0299644 | A1* | 10/2018 | Lee | G02B 7/28 |

OTHER PUBLICATIONS

Neufang: Lexikon der Electronik, first edition, Braunschweig/Wiesbaden: Friedr. Vieweg & Sohn, 1983, p. 2013, 214, 281, 295.—ISBN: 978-3-529-04099-4.

Lexicon of Electronics, Friedr. Vieweg & Son, Brunswick/Wiesbaden, Publisher's Editor: Alfred Schubert, 1st edition, 1983, pp. 1-10, ISBN-13: 978-3-528-04099-4, DOI: 10.1007/978-3-322-83515-4 213.

In: Wikipedia, Die freie Enzyklopadie. Bearbeitungsstand: Mar. 9, 2016, 13:18, [abgerufen am Sep. 7, 2017] UTC. URL: https://de.wikipedia.org/w/index.php?title=Gyrator&oldid=152331574 3 pages.

In: Wikipedia, The Free Encyclpedia. Date of processing: Mar. 9, 2016,13:18, retrieved [Jul. 19, 2017], UTC.URL: https://de.wikipedia.org/w/index.php?title=Gyrator&oldid=152331574 pp. 1-5.

* cited by examiner

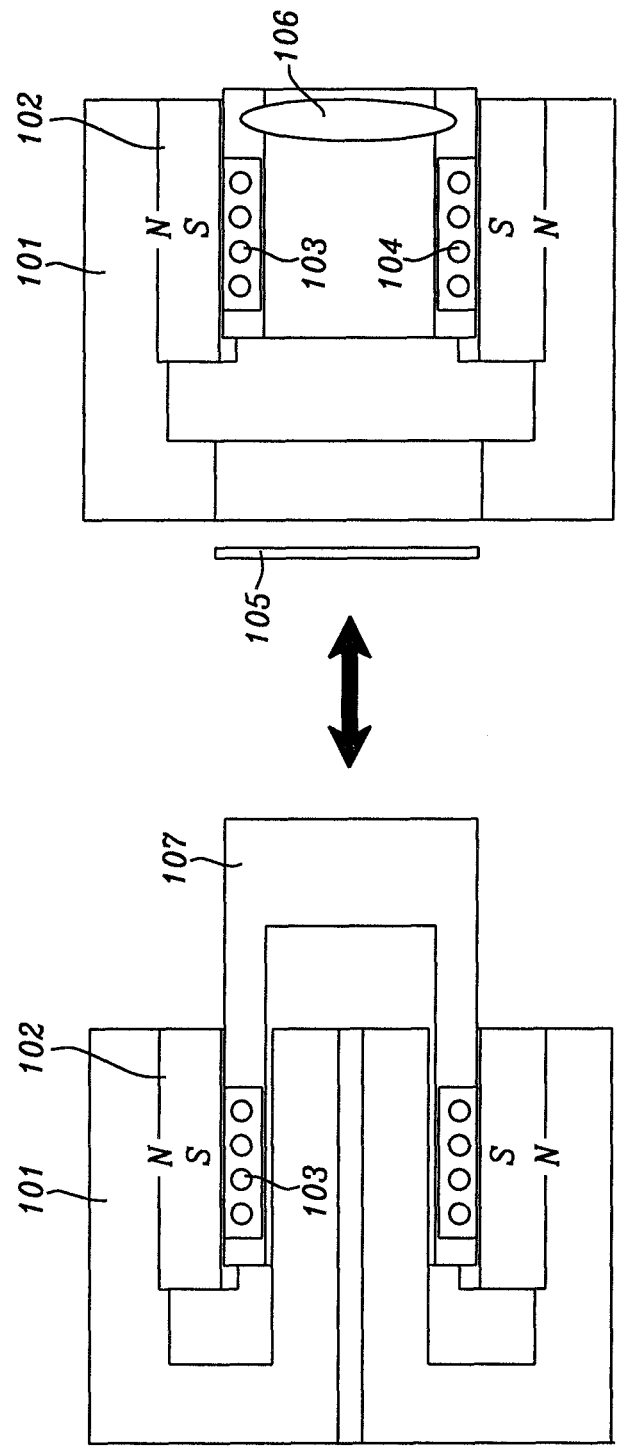

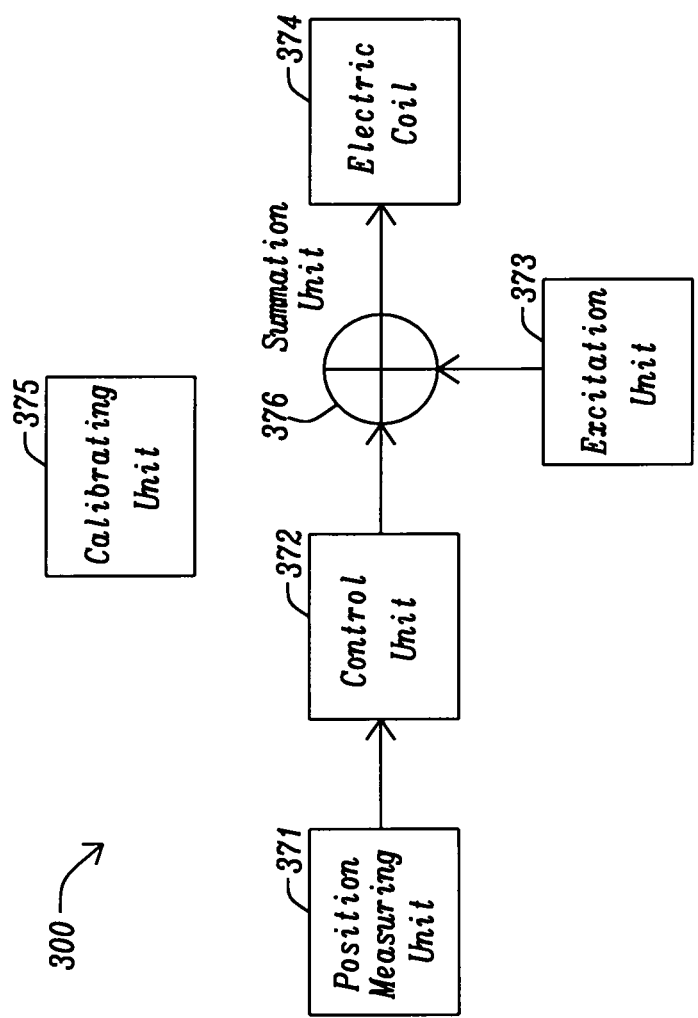

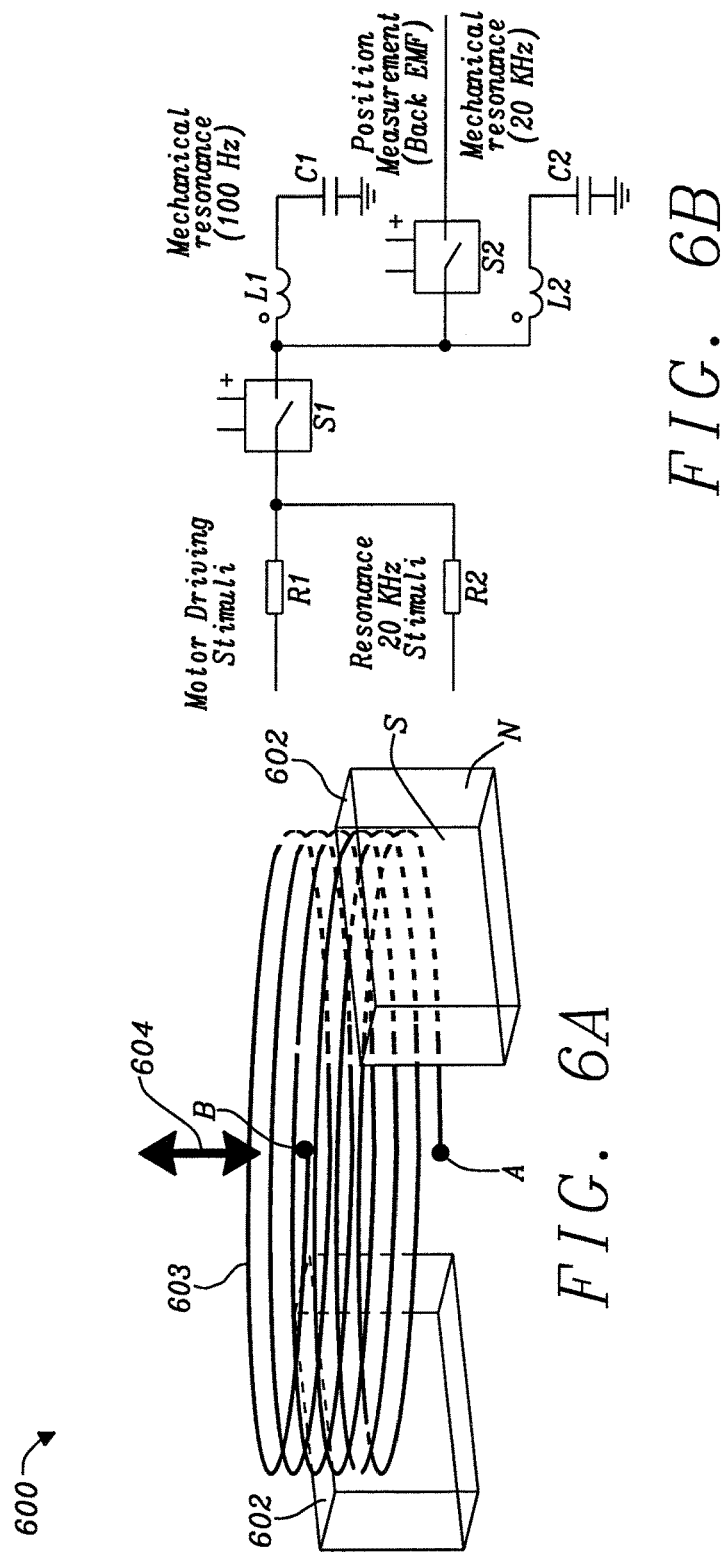

ACTUATOR WITH INHERENT POSITION SENSOR

TECHNICAL FIELD

The present document relates to an actuation system and method for controlling a motor, e.g. a voice coil motor (VCM), in an optical system.

BACKGROUND

Voice coil motor (VCM) actuators creating a one-directional (single-axis) stroke can be used for camera autofocus (AF), multi-axis optical image stabilization (OIS) or multi-axis haptic feedback applications. In case of multi-axis applications, a respective number of VCM actuators can be arranged accordingly.

Current VCM systems with higher performance employ Hall sensors for the position feedback of the moving part, which includes, e.g. coil and lens barrel in case of an AF camera module. This construction has some advantages, such as low current in idle stage as well as fast AF response. However, this setup requires additional elements, such as permanent magnets and Hall sensor ICs.

An alternative way is to use a spring-preloaded VCM with an excursion, which approximately depends on a linear restoring force that allows, after calibration, linear control via a current source. In general, this setup is used for more economic solutions. The drawback of this solution resides in increased power consumption as well as limited AF speed, which is limited by a resonance frequency of the mass-spring system.

SUMMARY

Therefore, there is a need for a more robust and simplified assembly for VCM implementation with reduced system costs. A reduced number of components further reduces system size.

In view of this need, the present disclosure proposes an actuation system and a corresponding method having the features of the respective independent claims for controlling a motor, e.g. a voice coil motor (VCM) in an optical system.

According to a broad aspect of the disclosure, an actuation system is provided for an optical system. The actuation system comprises a voice coil motor (VCM) for actuating the optical system. In general, the voice coil motor comprises at least one magnet (e.g. a permanent magnet) and an electric coil (e.g. an inductor). In particular, the electric coil may be movable together with one or more other elements of the optical system, for example, a lens of an image-focusing module. The actuation system further comprises a position-measuring unit for measuring the relative position of the moving part of the VCM system, e.g. the electric coil, versus the stationary part, e.g., the housing. The position-measuring unit may also be used for providing a position feedback signal. Based on the measured position of the electric coil, the position-measuring unit may provide the position feedback signal to actively control the position of the optical system.

According to the disclosure, the actuation system also comprises a control unit for closed loop control of the position of the optical system. More specifically, the control unit may receive the position feedback signal and control the position of the optical system based on a target position and the position feedback signal. Further, the control unit may be used for generating a drive signal for the electric coil. Accordingly, the position of the electric coil may be changed through the applied drive signal, which may, for example, generate an axial force.

Moreover, the actuation system may comprise a ferromagnetic element. The ferromagnetic element may be arranged in proximity to the electric coil so that the inductance of the electric coil varies depending on its relative position within the optical system, in particular relative to the ferromagnetic element. In particular, the inductance of the electric coil may vary based on a relative position between the electric coil and the ferromagnetic element. Furthermore, the position-measuring unit may measure the variable inductance of the electric coil. It is noted that the electric coil may be discharged prior to the measurement. Subsequently, the position-measuring unit may determine the position of the electric coil based on the determined inductance. In some embodiments, the inductance of the electric coil may be determined based on a measured voltage and/or a measured current that allows determining of the coil inductance based on the measured value.

Since the inductance of the electric coil depends on the relative position between the electric coil and the ferromagnetic element, the position of the electric coil can be determined through the knowledge of its relative position by measuring the variable inductance of the electric coil. In other words, the position feedback signal can be determined from the measured coil inductance, e.g. with the use of a mapping function or a lookup table. In addition, interpolation between data points may be used to determine the coil position more precisely.

In some embodiments, the actuation system may further comprise a summation unit for adding an AC signal to the drive signal for measuring the inductance of the electric coil. In particular, the AC signal may have a relatively higher frequency than the frequency of the drive signal (e.g. DC in steady state) for the electric coil. In other words, the drive signal for the electric coil, which causes the movement (i.e. a position change) of the electric coil, has a relatively lower frequency than the AC signal. The summed-up signal comprising the drive signal and the AC signal is then supplied to the coil.

As a result, by measuring the inductance of the electric coil for position sensing, the complexity of a VCM system can be reduced. Besides, this sensing technique makes any additional elements (e.g. magnets) for position sensing dispensable. For example, no Hall sensors are needed for this sensing technique. It is therefore appreciated that this position sensing technique using the knowledge of coil inductance can provide similar performance with a simple setup.

In some embodiments, the voice coil motor may further comprise another electric coil. The two coils may be arranged in series and both may move together in the moving part of the VCM. In particular, the position-measuring unit may measure a differential inductance between the electric coil and another electric coil. One of the electric coils may serve as a reference coil. Optionally, both coils may be measuring coils, one having a reversed direction of windings. In general, both coils may be driving coils and coils for differential inductance measurement.

The position-measuring unit may determine a relative position between the electric coil(s) and the ferromagnetic element based on the determined differential inductance. An example of the position-measuring unit may comprise a Maxwell bridge circuitry. Other type of circuitry may also be used as/for the position measuring unit. In some embodiments, a single coil inductance measurement may be conducted using the electric coil and another electric coil. In this case, one of the electric coils may comprise a Gyrator, e.g. the reference coil equivalent circuitry may comprise a Gyrator.

As a result, by measuring the coil inductance (e.g. the single/absolute inductance and/or the differential inductance), one can use a VCM actuator itself for position sensing without applying Hall sensors for position feedback, which also reduces mechanical/electrical connections between the modules thereof. In other words, the proposed system employs a simplified and efficient position sensing technique to replace Hall sensors by using the existing parts of the VCM itself for position sensing. It is appreciated that the proposed system has similar performance but can be implemented with a more cost-effective setup.

According to another broad aspect of the disclosure, an actuation system is provided for an optical system. The actuation system comprises a voice coil motor (VCM) for actuating the optical system. In general, the voice coil motor comprises at least one magnet (e.g. a permanent magnet) and an electric coil (e.g. an inductor). In particular, the electric coil may be movable together with one or more other elements of the optical system, for example, a lens of an image-focusing module. The actuation system further comprises a position-measuring unit for measuring the position of the electric coil. The position-measuring unit may also be used for providing a position feedback signal. Based on the measured position of the electric coil, the position-measuring unit may provide the position feedback signal to actively control the position of the optical system.

According to the disclosure, the actuation system also comprises a control unit for closed loop control of the position of the optical system. More specifically, the control unit may receive the position feedback signal and regulate the position of the optical system based on a target position and the position feedback signal. Further, the control unit may be used for generating a drive signal for the electric coil. Accordingly, the position of the electric coil may be changed through the applied drive signal, which can, for example, generate an axial force.

Moreover, the actuation system may comprise an excitation unit. The excitation unit may be used for generating a higher frequency excitation signal. The excitation signal may be a periodic alternating current signal with alternating portions of positive and negative current sections. In particular, the high frequency excitation AC signal may be superimposed on the drive signal (e.g. through a summation unit) so that the coil current comprises a first component caused by the drive signal and a second component caused by the excitation signal. Further, the high frequency excitation signal (second coil current component) may cause a designated Back-EMF (back electromotive force) component of the electric coil. More specifically, the position-measuring unit may measure the Back-EMF component of the coil caused by the AC excitation signal. Subsequently, the position-measuring unit may determine the position of the electric coil based on the measured Back-EMF component. It is noted that the electric coil may be discharged prior to the measurement of the Back-EMF of the coil. Typically, the Back-EMF is small compared to the excitation AC. Sensing under applied AC excitation (and possibly driving current) means sensing a small phase shift, which is more difficult. In embodiments, the AC excitation current may be discharged together with the driving current component as both are driven via the same terminals (thereby the coil can be discharged).

In some embodiments, the voice coil motor of the actuation system comprises a permanent magnet. The permanent magnet may cause a static permanent magnetic field. In particular, the Back-EMF of the coil may vary based on a relative position (e.g. an overlap portion) between the electric coil and the static permanent magnetic field. The Back-EMF further depends on the movement (speed) of the coil, which is modulated with the higher frequency excitation signal. It is noted that the excitation current of the drive signal for the electric coil may periodically reach zero. According to this, the position-measuring unit may measure a difference in the Back-EMF of the coil at subsequent current zero crossings of the excitation signal for the electric coil to obtain the overlap portion for the position determination from an evaluation of the Back-EMF difference.

Since the Back-EMF of the electric coil depends on the overlap portion between the electric coil and the static permanent magnetic field, the position of the electric coil can be determined through the knowledge of the overlap portion by measuring the Back-EMF of the electric coil. In other words, the position feedback signal can be determined from the measured Back-EMF, e.g. with the use of a mapping function or a lookup table. In addition, interpolation between data points may be used to determine the coil position.

According to the disclosure, the position measuring unit may measure the Back-EMF based on a difference in the Back-EMF at subsequent current zero crossings of the excitation signal. The position-measuring unit may also measure a Back-EMF offset. According to some embodiments, a residual coil speed may be further obtained based on the Back-EMF offset and/or the difference in the Back-EMF. The position-measuring unit may further measure the Back-EMF (e.g. the absolute Back-EMF) based on the overlap portion. Accordingly, the position feedback signal may comprise information on the determined position (through the knowledge of the overlap portion) and the residual coil speed (that causes an offset to the Back-EMF waveform) that might be preferably evaluated close to or at time instants of zero crossing of the time varying excitation signal. Further, the actuation system may also comprise a calibrating unit to obtain linear positioning.

As a result, by using the measured Back-EMF of the electric coil as information to determine the overlap between the coil and the static permanent magnetic field for position sensing, no Hall sensors for position feedback are required, which simplifies a VCM setup with fewer modules and connections between/in the modules thereof. In other words, the proposed system uses the existing parts of the VCM itself to replace Hall sensors for position sensing. Thus, a good response time for a VCM system can be obtained by using this cost-effective way.

According to another aspect, a method for actuating a voice coil motor in an optical system is provided. In general, the voice coil motor has a magnet and an electric coil. As mentioned above, the electric coil may be movable together with one or more other elements of the optical system, for example, a lens of an image-focusing module.

According to the disclosure, the method comprises measuring the inductance of the electric coil. The method also comprises determining the position of the electric coil. In detail, the position of the electric coil may be determined based on the measured inductance. Furthermore, the method comprises providing a position feedback signal. In particular, the position feedback signal may be provided based on the determined position. Subsequently, the method comprises controlling the position of the optical system. The position of the optical system may be regulated based on a target position and the position feedback signal. Also, the method comprises generating a drive signal for the electric coil based on the determined position. Accordingly, the position of the electric coil may be changed through the applied drive signal, which may, for example, generate an axial force.

In detail, the inductance of the electric coil may depend on its position. More specifically, the inductance of the electric coil may vary based on a relative position (e.g. an overlap portion) between the electric coil and a ferromagnetic element. In some embodiments, the method may further comprise measuring a voltage and/or a current associated with the electric coil. Thus, the inductance of the electric coil may be determined based on the measured voltage and/or the measured current. Also, the method may further comprise discharging the electric coil prior to the measuring.

Furthermore, the drive signal for the electric coil may have a low frequency. The method may further comprise adding an AC signal to the drive signal for measuring the inductance of the electric coil. It is noted that the AC signal may have a relatively higher frequency than the frequency of the drive signal for the electric coil. As the drive signal for the electric coil, which causes the movement (i.e. a position change) of the electric coil, has a relatively lower frequency than the AC signal, the electric coil may be quickly discharged so as to speed up the measurement of the electric coil inductance.

As a result, by measuring the inductance of the electric coil for position sensing, the total response time for a VCM system can be reduced. Besides, this sensing method makes any additional magnets for position sensing dispensable. For example, no Hall sensors are needed for this sensing method. Therefore, the proposed position sensing method using the knowledge of coil inductance can provide higher performance for a VCM system in a cost-effective way.

In some embodiments, the voice coil motor may further comprise another electric coil. In these cases, the method may further comprise measuring a differential inductance between the electric coil and another electric coil. Further, the method may also comprise determining a relative position between the electric coil and the ferromagnetic element based on the determined differential inductance. As a result, the proposed method using a VCM actuator itself for position sensing can provide for a VCM system without applying any Hall sensors for position feedback, which also reduces connections between/in the modules thereof. In other words, the proposed method enables a simplified setup for efficient position sensing, thereby providing higher performance in a cost-effective way.

According to another aspect, a method for actuating a voice coil motor in an optical system is provided. As mentioned above, the voice coil motor has a magnet and an electric coil. In particular, the electric coil may be movable together with one or more other elements of the optical system, for example, a lens of an image-focusing module.

According to the disclosure, the method comprises generating a drive signal for the electric coil. The method also comprises generating a high frequency excitation signal. In particular, the higher frequency excitation signal may be superimposed on the drive signal for the coil so that the coil current has a DC component caused by the drive signal and an AC component caused by the excitation signal.

Further, the higher frequency excitation signal may cause a varying Back-EMF component and the DC coil current may cause a Back-EMF offset of the electric coil. The method comprises measuring the variable Back-EMF of the coil caused by the excitation signal. Subsequently, the method further comprises determining the position of the electric coil based on the measured Back-EMF. It is noted that the method may further comprise discharging the electric coil prior to the measuring of the Back-EMF of the coil.

According to the disclosure, the method also comprises providing a position feedback signal. In particular, the position feedback signal may be provided based on the determined position as disclosed above. The method further comprises a closed loop controlling the position of the optical system. More specifically, the position may be regulated based on a target position and the position feedback signal.

In some embodiments, the voice coil motor of the actuation system may further comprise a permanent magnet. Thus, the Back-EMF of the coil may vary based on a relative position (e.g. an overlap portion) between the electric coil and a static permanent magnetic field caused by the permanent magnet of the voice coil motor. It is also noted that a current of the drive signal for the electric coil may reach zero when the electric coil is discharged. More specifically, the driving signal may comprise a DC current part (component) and an AC current part (component), and the AC current part may reach zero value at certain instances when the alternating current changes polarity. According to this, the method may further comprise measuring a difference in the Back-EMF of the coil at subsequent current zero crossings of the drive or excitation signal for the electric coil to obtain the overlap portion for the position determination. The overlap portion may be determined based on the measured difference in the Back-EMF. In some embodiments, the method may further comprise measuring a Back-EMF offset. The method may also comprise obtaining a residual coil speed based on the Back-EMF offset and/or the difference in the Back-EMF. The method may also comprise measuring the Back-EMF (e.g. the absolute Back-EMF) based on the overlap portion. Accordingly, the position feedback signal may comprise knowledge of the determined position (through the knowledge of the overlap portion) and the residual coil speed.

As a result, by measuring the Back-EMF of the electric coil to obtain the overlap between the electric coil and the static permanent magnetic field and/or the residual coil speed for position sensing, no Hall sensors for position feedback are required, which simplifies a VCM setup with fewer connections between the modules thereof. In other words, the proposed method uses the existing parts of the VCM itself for position sensing to replace Hall sensors. Also, a good response time for a VCM system can be obtained in a cost-effective way.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the terms "couple", "coupled", "connect", and "connected" refer to elements being in electrical communication with each other, whether directly connected e.g., via wires, or in some other manner.

BRIEF DESCRIPTION OF THE DRAWINGS

The application is explained below in an exemplary manner with reference to the accompanying drawings, wherein:

FIG. 1(A) schematically illustrates an example of an actuation system using a voice coil motor (VCM) for general purpose;

FIG. 1(B) schematically illustrates an example of an actuation system using a voice coil motor (VCM) for a camera module;

FIG. 3(B) schematically illustrates exemplary components of an actuation system;

FIG. 6(A) schematically illustrates an arrangement of an actuation system for an optical system with position sensing according to embodiments of the disclosure;

FIG. 6(B) schematically illustrates an equivalent circuit for position sensing as illustrated in the actuation system of FIG. 6(A) according to embodiments of the disclosure;

DETAILED DESCRIPTION

Figure 2A:
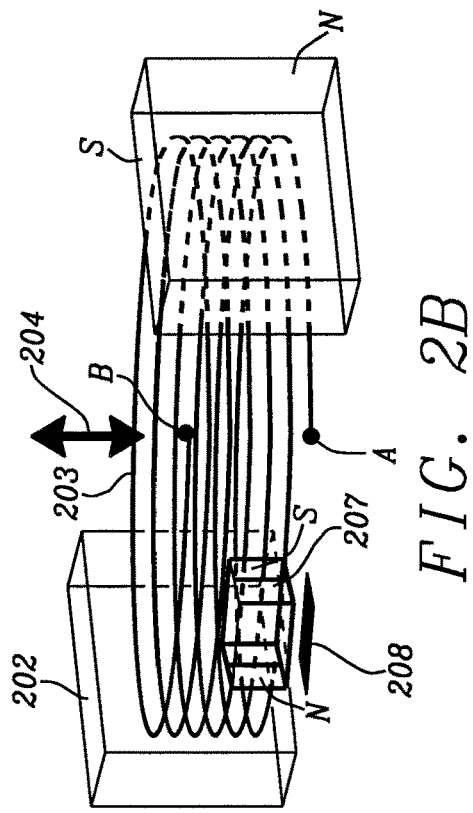
FIG. 2(A) schematically illustrates an arrangement of a spring-preloaded VCM actuator.

FIG. 1(A) schematically illustrates an example of an actuation system using a voice coil motor (VCM) for general purpose. The construction for a general-purpose VCM actuator without spring restoring force comprises a housing 101 which may be made of, e.g. ferromagnetic material to provide a magnetic flux path. The VCM actuator also comprises a permanent magnet 102 and a coil 103. The coil 103 is mounted on a suspension link (e.g. through a coil cradle). With air gaps between the coil 103 and the housing 101 as well as between the coil 103 and the permanent magnet 102, the coil 103 is moveable between the housing 101 and the permanent magnet 102. The housing 101 may have a center pin to close the magnetic flux path and to provide sliding support for a suspension link 107 having a coil cradle for carrying the coil 103. The moving direction of the suspension link 107 is shown by the double arrow.

For example, in case of a camera module (i.e. a VCM camera module) as shown in FIG. 1(B), the construction is adapted to allow an arrangement of a coil mounted on a lens barrel, including the housing 101, the permanent magnet 102, the coil 103, a lens barrel 104, a lens 106 and an image sensor 105. In general, the coil 103 together with the permanent magnet 102 form the VCM, and the lens barrel 104 typically occupies the center of the VCM.

VCMs of different constructions can include a spring to apply a restoring force to the moving mass (e.g. to reach a predefined idle state per default). FIG. 2(A) schematically illustrates an arrangement of a spring-preloaded VCM actuator. The spring-preloaded VCM actuator includes a stationary permanent magnet 202, a coil 203 and a spring 206. The coil 203 is mounted with the spring 206 and is moveable along the direction as indicated by the arrow 204. The coil terminals are marked with A, B. As in the case of a camera module VCM, this spring functionality can be realized together with leads for supplying current to the moveable coil.

Figure 2B:
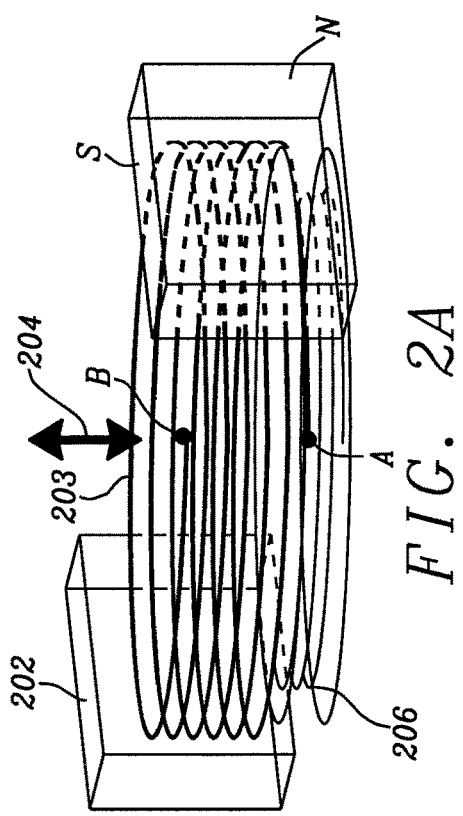
FIG. 2(B) schematically illustrates an arrangement of a VCM actuator with a Hall sensor.

To improve the performance of a VCM actuation system, a Hall sensor can be employed for the position feedback of the moving part (i.e. the coil together with the lens barrel). FIG. 2(B) schematically illustrates an arrangement of a VCM actuator with a Hall sensor (stationary). In addition to the permanent magnet 202 and the coil 203 as shown in FIG. 2(A), the VCM actuator further includes a magnet 207 fixed to the moving coil 203 and a Hall sensor 208 instead of the spring 206. The magnet 207 is fixed to the coil 203 and is moveable together with the coil 203 along the direction as indicated by the arrow 204. Advantages of this construction are low current in the idle stage as well as fast autofocus (AF) response, but this kind of VCM actuator requires additional elements such as magnets and Hall sensor ICs.

Generation of force for moving the actuator can be realized by applying current to the coil in general, permanent magnets are used to generate a magnetic flux perpendicular to the windings of the coil. The generated electromagnetic force (F) depends on the coil current ($i_{coil}$) and is basically given by $F=B \times i_{coil} \times l$, where l represents the total length of coil wire perpendicular to the magnetic field B. Thus, the motor force is a function of the magnetic flux density of the coil, the current and the number of windings. Besides, the permanent magnet has the permeability of air ($\mu_r=1$), which means that the VCM coil does not change its inductance when it changes its position relative to the permanent magnet. In other words, the permanent magnet is neutral for the inductor/inductance when the VCM coil is moving in the magnet field of the magnet. As such, the inductor/inductance will not change its value during movement in the magnetic field.

Furthermore, the impedance of the coil may be dominated by the resistance thereof within the VCM's operating bandwidth. That is, the coil inductance may depend on the effective magnetic path length and may become apparent at higher frequencies. In practice, VCM or linear-motor like actuators for camera autofocus (AF) or multi-axis optical image stabilization (OIS) are likely designed with the target to keep the weight of the moving part as small as possible. As such, the coil of a VCM or a linear motor may be referred to as the moving part. However, in some cases, the coil is bonded to e.g. the housing of the actuator (and thereby is regarded as stationary), whereas other elements (such as permanent magnets) may contribute to the moveable mass accordingly.

VCM actuators are used for different applications that require assertion of controlled force over a limited stroke. The model of such a system (i.e. a VCM actuator without spring restoring force) comprises a mass which includes the coil and the lens barrel and which may be excited by a controlled force (i.e. electromotive force (EMF) via the coil current and a statically-applied magnetic field) and a limited disturbance in form of an uncontrollable force (e.g. impact of gravitation depending on camera orientation, acceleration of the camera itself and static friction). Also, the movement of the mass may be damped by the air enclosed in the module and sliding friction. In general, the impact of the coil terminals and affiliated connections can be expected to be low. For the case of VCM actuators without a spring restoring force, the initial position of the actuator may be undefined and depend on movement history.

Figure 2C:
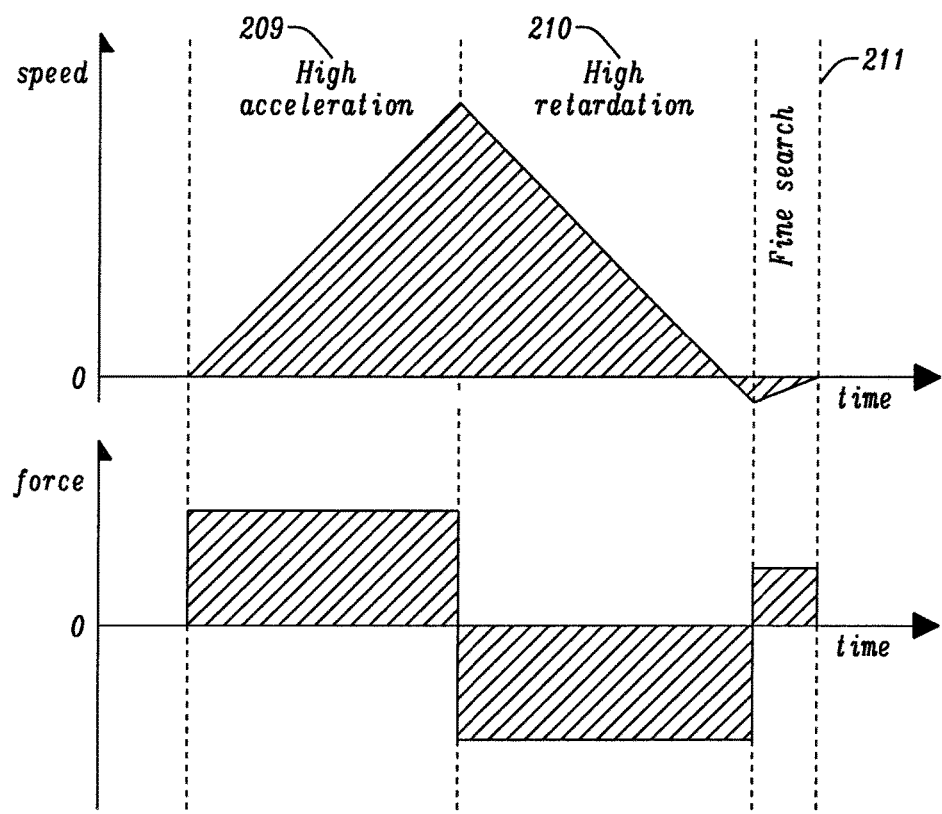
FIG. 2(C) graphically illustrates a speed-time diagram of a VCM actuator without spring restoring force.

For the case of camera autofocus (AF) actuators, a new lens position should be reached within 10 ms to meet the most general performance requirement. A typical profile of speed to stroke is shown in FIG. 2(C). The top part of FIG. 2(C) graphically illustrates a speed-time diagram of a VCM actuator without spring restoring force. The bottom part of this figure shows the corresponding force. Based on the change of the speed, the diagram can be divided into three consecutive areas, i.e. high acceleration area 209, high retardation area 210 and fine-search area 211. The motor starts with high (maximum) acceleration and moves close to the middle of the targeted change in distance (i.e. the travel distance) as shown by the high acceleration area 209. When the position reaches close to the middle of the target position (or half the travel distance), the motor has to break with the maximum speed and the force changes to high (maximum) retardation (of ideally the same maximum force) as shown by the retardation area 210. When the position reaches close to the target position, a regulated fine-search movement is applied to ensure the required positioning accuracy, as shown by the fine-search area 211. It is noted that the fine-search area 211 should be as small as possible. In an ideal way, the reverse point (from the acceleration to the breaking) should be half of the travel distance, if the acceleration and the breaking processes have the same behavior. Accordingly, the regulation part (i.e. the fine-search moving) will end at the target position.

A general requirement for high performance camera modules is that the point-to-point movement of the actuator should be completed within about 10 ms. Thus, the position detection needs to be much faster to detect the optimum point for application of the reverse force (i.e. to measure the reverse point). Due to mechanical limitations, the bandwidth of a VCM actuator does not exceed 1 kHz, and the bandwidth of the position measurement should be at least a factor of 20 higher than the bandwidth of the VCM (i.e. 20 kHz or higher). For a total AF lens operating range of 2 mm, the maximum speed of the moving part may be about 2 mm/10 ms*2=0.4 m/s. Of course, the maximum speed of the VCM moveable part, as well as the realizable operating range, depends on the constructional details.

Figure 3A:
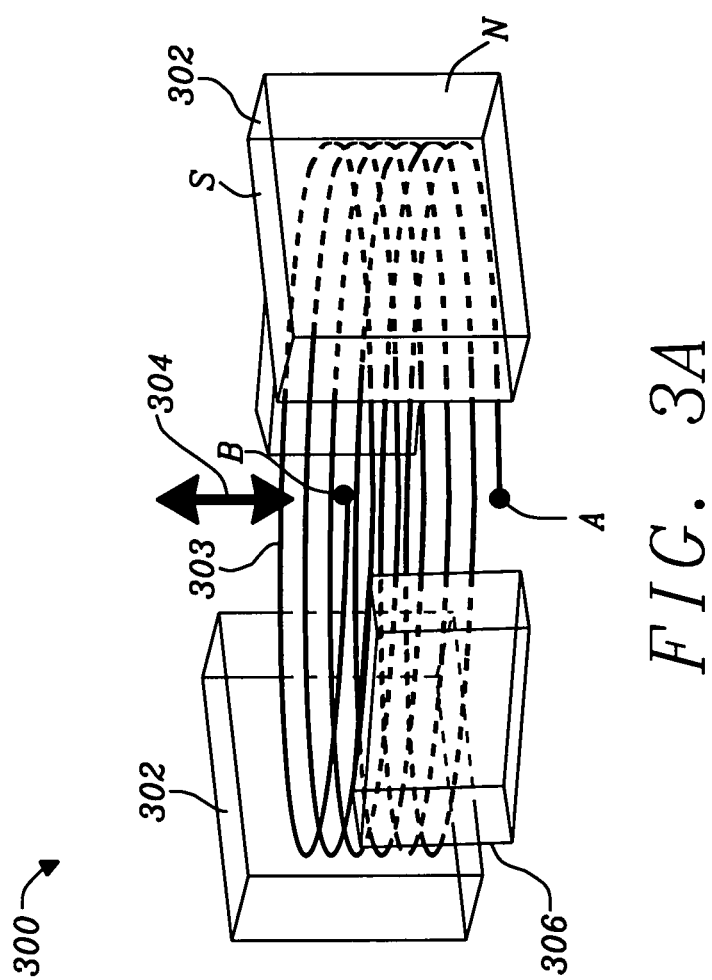
FIG. 3(A) schematically illustrates an arrangement of an actuation system for an optical system with position sensing according to embodiments of the disclosure.

FIG. 3(A) schematically illustrates an arrangement of an actuation system for an optical system with position sensing according to embodiments of the disclosure. The actuation system 300 comprises a voice coil motor (VCM) for actuating the optical system and may be referred as a VCM actuator. The voice coil motor includes at least one magnet 302 (which can be, e.g. a stationary permanent magnet) and an electric coil 303. Based on the current applied to the coil 303, the coil moves in the magnetic field of the magnet 302 along the direction as indicated by the arrow 304. The actuation system 300 also includes a position-measuring unit (not shown in FIG. 3(A)) for measuring the position of the electric coil and providing a position feedback signal. Moreover, a ferromagnetic element 306 (e.g. a stationary small iron plate, shown only schematically) is arranged in proximity to the electric coil 303, so that the inductance of the electric coil 303 depends on its position. In particular, the ferromagnetic element 306 may have one or more iron parts, and the magnet(s) 302 for the motor VCM can be placed between the irons. As mentioned above, the moving direction is shown by arrow 304. The coil during the movement will be more or less coved by the iron (i.e. the ferromagnetic element 306) and will change the value of its inductance depending on the overlap between iron and coil. This change of the coil inductance thus indicates the position of the moving inductor (i.e. the coil 303).

To provide the position feedback signal, the position-measuring unit measures the inductance of the electric coil 303 and determines the position of the electric coil 303 based on the determined inductance. In general, the inductance of the electric coil may be measured/determined based on a measured voltage and/or a measured current. The position feedback signal thus contains information of the position of the coil 303. The actuation system 300 further includes a control unit (not shown in FIG. 3(A)) for closed loop control of the position of the optical system based on a target position and the position feedback signal. Also, the control unit can be used for generating a drive signal for the electric coil 303. The coil 303 is supplied with drive current for its movement by the drive signal. Thus, position sensing can be achieved via the position-depending modulation of VCM coil inductance.

It is noted that the embodiment shown in FIG. 3(A) comprises a single end inductor, which provides a position-sensing signal that may be a nonlinear function of the coil position. Also, the VCM actuator described herein is not spring preloaded and therefore is operating without a spring restoring force.

However, in another embodiment, more than one inductor may be employed for the VCM actuator and/or the VCM actuator may include a spring that does not significantly affect the dynamics of the system for at least one of the intended actuator operating modes. It is further noted that the resonant frequency of the resulting spring mass system is generally significantly smaller than the required control bandwidth.

According to the embodiment of FIG. 3(A), the coil of the VCM actuator comprises an inductor having its inductance changing depending on the relative position between the coil and the additional ferromagnetic material. The change of the coil inductance is established by the ferromagnetic material in proximity of the coil (and thereby in the path of the magnetic field lines). In general, this inductance change is established by changing the relative position, e.g. overlap, between the movable coil (windings) and the ferromagnetic material.

In detail, one part of the magnetic path length of the inductor (coil) is in air ($\mu_r=1$) and the other part is inside the range of ferromagnetic material ($\mu_r \gg 1$). The effective magnetic path length (normalized to air) can then be represented as:

$$l_e = l_g + l_m/\mu_{r,fe},$$

where $l_g$ denotes the path length in air ($\mu_r=1$) and $l_m$ denotes the path in the range of ferromagnetic material ($\mu_{r,fe} \gg 1$). The coil inductance can then be written as $$L = \mu_0 \times \mu_r \times N^2 \times A/l_e,$$

where N represents number of turns of the coil windings and A represents the cross-section area of the coil windings. Thus, by arranging some iron/ferrite material near by the inductor, the inductor value/inductance can be modified in dependence on the relative position between coil and ferrite material. The additional permanent magnets are used for generating the driving force of the actuator. The resulting position-dependent coil inductance may (based on positioning of the magnetic field lines) have a nonlinear dependency. In the embodiment in FIG. 3(A), the inductance may be expected to change around ~5% over the coil moving range.

In embodiments, there may exist a design target to generate an electromagnetic force proportional to coil current over the whole working range. In order to achieve this target, the same number of coil turns should remain exposed to the magnetic field over the whole working range of the VCM. This objective may not be compromised by changing the coil inductance depending on the displacement of the coil from the position of the permanent magnet. Furthermore, the movement of a coil that carries current in the vicinity of ferromagnetic material may provoke a breaking force. This force can exist when the magnetic flux component is perpendicular to the ferromagnetic material and may be considered in system dynamics.

Also, the inductance change with the movement of the current driven coil (due to the change in relative position between the coil and ferromagnetic material) may impact the voltage via the inductor as well as the required driving voltage capability of a current source. Also, the magnetic field of the permanent magnet and that caused by the coil carrying current are perpendicular to each other at the ferromagnetic stationary material, both of which can impact the magnetic flux (lines) within the ferromagnetic material. It can therefore be expected that the permanent magnetic field reduces the effective permeability of the ferromagnetic material with view on the coil inductance.

As mentioned above, the mechanical resonant frequency of the mass system in a VCM is generally smaller than the required control bandwidth. Thus, an AC signal may be overlaid in the measurement system. The actuation system may further comprise a summation unit (not shown) for adding the AC signal to the drive signal for measuring the inductance of the electric coil. In particular, the AC signal has a relatively higher frequency than the frequency of the drive signal for the electric coil. Accordingly, the coil driving current to generate an axial force has harmonics of relatively lower frequency, while the coil AC current overlaid in the measurement system to assess (measure) the resulting inductance is of relatively higher frequency. The coil inductance may also be discharged (e.g. to zero current) prior to the measurement. Further, any residual speed from an ongoing coil movement may introduce a DC offset voltage via the coil terminals. A solution to this effect may be to decouple the evaluated AC voltage of the coil from the DC offset.

FIG. 3(B) schematically illustrates exemplary components of the actuation system 300. The actuation system 300 may comprise a position-measuring unit 371 for measuring a position of an electric coil 374 and providing a position feedback signal. The actuation system 300 may comprise a control unit 372 for closed loop control of a position based on a target position and the position feedback signal, and for generating a drive signal for the electric coil 374. The actuation system 300 may comprise an excitation unit 373 for generating a high frequency excitation signal. The actuation system 300 may comprise a summation unit 376 for adding the high frequency excitation signal to the drive signal. Further, the actuation system 300 may comprise a calibrating unit 375 to obtain linear positioning and/or to compensate for tolerances.

Figure 4:
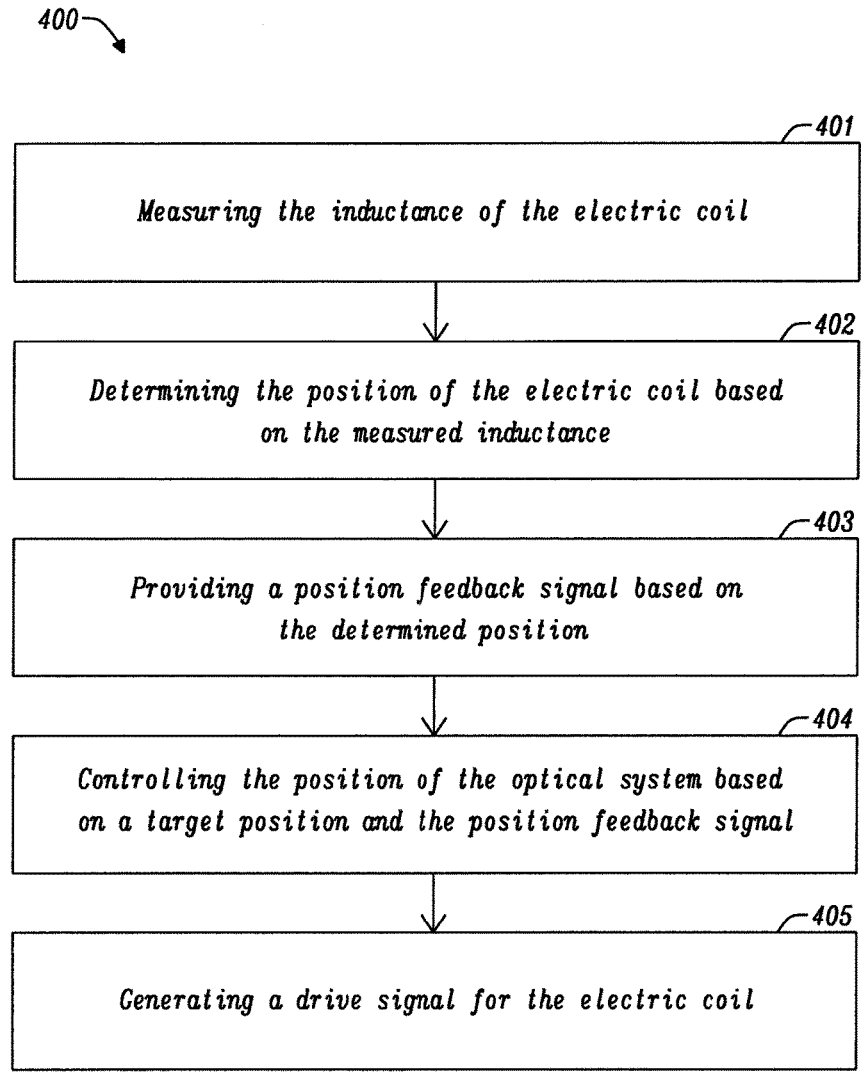
FIG. 4 schematically illustrates a flow diagram of an example method for operating the actuation system of FIG. 3 according to embodiments of the disclosure.

FIG. 4 schematically illustrates a flow diagram of an example method 400 for operating the actuation system 300 according to embodiments of the disclosure. The method 400 comprises measuring (step 401) the inductance of the electric coil. The method 400 also comprises determining (step 402) the position of the electric coil based on the measured inductance. The method further comprises providing (step 403) a position feedback signal based on the determined position. The method comprises controlling (step 404) the position of the electric coil (and thereby the optical system) based on a target position and the position feedback signal. The control method may be a closed-loop control. The method also comprises generating (step 405) a drive signal for the electric coil.

Figure 5A:
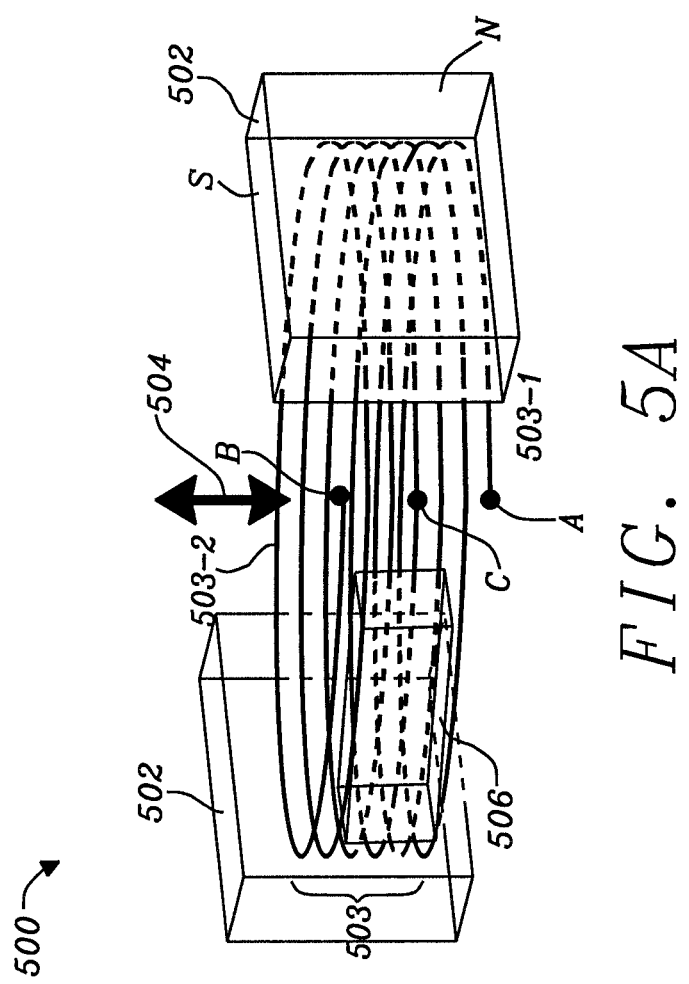
FIG. 5(A) schematically illustrates an arrangement of an actuation system for an optical system with position sensing according to embodiments of the disclosure.

FIG. 5(A) schematically illustrates an arrangement of an actuation system for an optical system with position sensing according to embodiments of the disclosure. The actuation system 500 comprises a voice coil motor (VCM) for actuating the optical system and may be referred as a VCM actuator. The voice coil motor includes at least one magnet 502 (which can be, e.g. a permanent magnet) and an electric coil 503. According to the embodiment of FIG. 5(A), the windings of the electric coil 503 may be separated in two sections 503-1, 503-2 which provide a center tap C and two winding terminals A, B. For the purpose of actuating the VCM (via generation of the axial force), the coils can be operated as one single VCM coil 503. For example, by supplying the driving current via terminals A and B. However, for the purpose of position measuring, this construction can be regarded as using two inductors. If two different winding directions are used, then one of the windings may be used for generating the EMF. Due to the current applied to the coil 503, the coil can move in the magnetic field of the magnet 502 along the direction as indicated by the arrow 504. Similar to the actuation system 300, the actuation system 500 also includes a position-measuring unit (not shown in FIG. 5(A)) for measuring the position of the electric coil and providing a position feedback signal. Moreover, a stationary ferromagnetic element 506 (e.g. an iron plate) is arranged in proximity to the electric coil 503, so that the inductance of the electric coil 503 depends on its position. In particular, the ferromagnetic element 506 may have one or more iron parts, and the magnet(s) 502 for the motor VCM can be placed between the irons. As mentioned above, the moving direction is shown by arrow 504. During the movement, the electric coil sections will be more or less coved by the iron (i.e. the ferromagnetic element 506) and will change the value of its inductance. This change of the coil sections inductances thus indicates the position of the moving inductor (i.e. the coil 503).

In detail, the center tap C allows differential measurement of the relative position (i.e. between the respective coils and the ferromagnetic material), which depends on the inductance related to the individual sections. For example, during the movement, the inductance of the partial coil 503-1 is changed from $L_o$ to $L_o + \Delta L$, while the inductance of the partial coil 503-2 is changed from $L_o$ to $L_o - \Delta L$, thereby keeping the overall inductance of the coil 503 constant ($2L_o$)

during the moving process. With the knowledge of the coil inductance change (ΔL), the position of the coil 503 can then be determined.

Figure 5B:
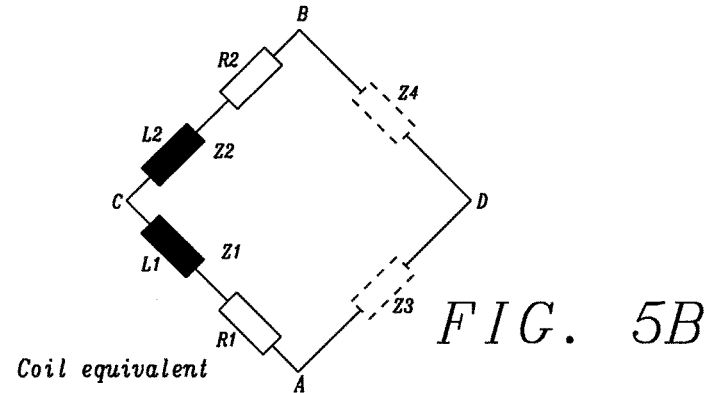
FIG. 5(B) schematically illustrates a measurement circuitry for differential-position sensing as illustrated in the actuation system of FIG. 5(A) according to embodiments of the disclosure.

There are several ways to measure the inductor (the inductance) for the position detection. FIG. 5(B) schematically illustrates a measurement circuitry for differential-position sensing as illustrated in the actuation system 500 according to embodiments of the disclosure. According to the embodiment, the position-measuring unit comprises a Maxwell bridge (Maxwell-Wien bridge) circuitry. However, in other embodiments, the measurement may be also based on other possible circuitry or without any compensation. FIG. 5(B) depicts a resulting equivalent network for evaluation of the differential inductance using a Maxwell bridge circuitry. The inductor L1 (together with the resistor R1) may be regarded as equivalent to the partial coil 503-1, and the inductor L2 (together with the resistor R2) may be regarded as equivalent to the partial coil 503-2.

According to one measurement approach, the coil driving source is applied to the A and B terminals (corresponding to the A and B terminals of FIG. 5(A)), i.e. the low-frequency (LF) coil supply source may be connected to A and B terminals. On the other hand, the means for sensing including the low amplitude high frequency (HF) supply is connected at C (corresponding to the center tap C of FIG. 5(A)) and D terminals (with a tendency to cancel each other with respect to the generation of electromagnetic force). In particular, by compensating the positive phase angle of an inductive impedance (e.g. L1, L2) with the negative phase angle of a capacitive impedance when put in the opposite arm (e.g. Z4, Z3) under the condition that the circuit is at resonance (i.e. no current flowing between C and D), the unknown inductance (e.g. L1, L2) then can be obtained in terms of this capacitance. In another example, both LF- and HF-supply components may also be provided via A and B terminals, and C and D terminals may be applied for sensing only.

According to another approach for measuring the varying coil inductance, the measurement AC signal ($V_{CD\_}$ac) is applied between the C and D terminals. The resulting AC signal between terminals A and B ($V_{AB\_}$ac) is zero if the following relation is met: $(XL2+R2)/Z4=(XL1+R1)/Z3$. The remaining $V_{AB\_}$ac might be used to evaluate the relation between L1 and L2. Z4 and Z3 might be realized as inductance equivalent (and probably tunable) circuitry, for example a Gyrator as shown in FIG. 5(D). As such, resonance is not required in this approach.

Figure 5C:
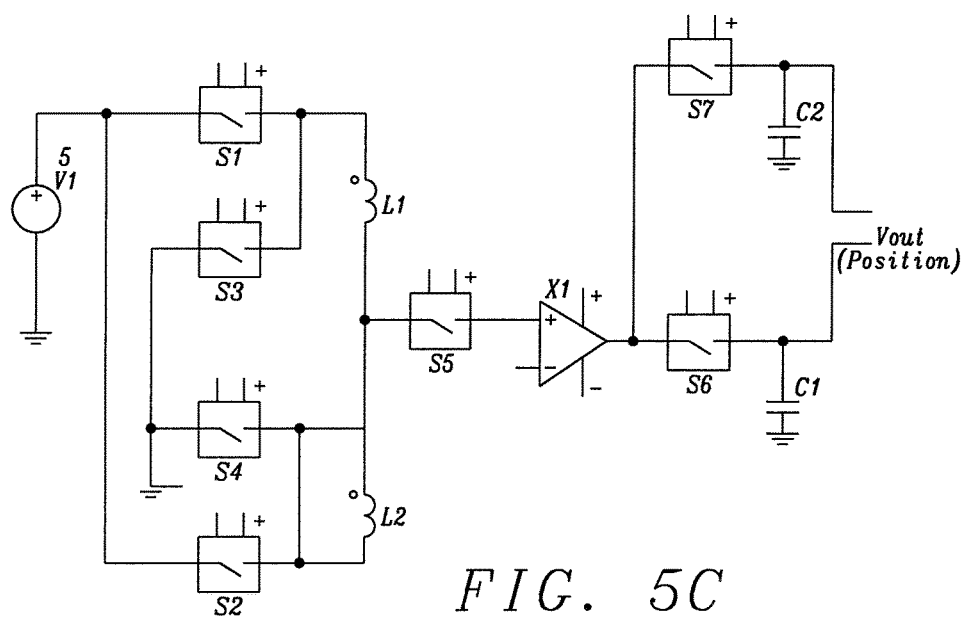
FIG. 5(C) schematically illustrates a measurement setup for differential-position sensing as illustrated in the actuation system of FIG. 5A according to embodiments of the disclosure.
Figure 5D:
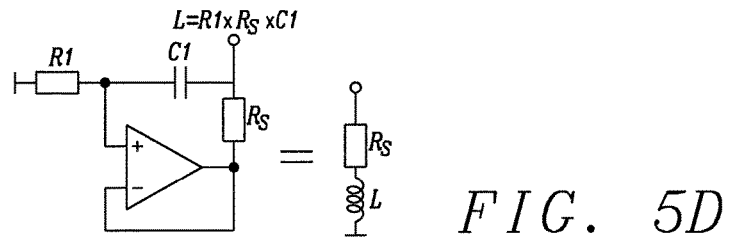
FIG. 5(D) schematically illustrates an example circuitry of a Gyrator.

FIG. 5(C) schematically illustrates a measurement circuitry for differential-position sensing as illustrated in the actuation system 500 according to embodiments of the disclosure. The setup of FIG. 5(C) applies the concept of the circuitry of FIG. 5(B) and may be regarded as an implementation embodiment. With the assistance of switches S1, S2, S3 and S4, a bridge circuitry can be realized to measure the inductance of L1 and L2. For example, when S1 and S4 have on-state and S2 and S3 have off-state, a current flows through L1 and L2, and a first measurement value can be obtained at the output end of the switch S7. On the contrary, when S2 and S3 have on-state and S1 and S4 have off-state, a current in opposite direction flows through L1 and L2, and a measurement signal can be obtained at the output end of the switch S6. Switch S5 represents a Sample-and-Hold unit and determines the sample instance. Subsequently, the output voltage Vout (which is a differential voltage) is measured to determine the overall inductance change ΔL. When ΔL is known, the position of the coil 503 can be obtained accordingly. Switch S5 and amplifier X1 operate as sample and hold element for a subsequent analog-to-digital converter (ADC).

In this respect, FIG. 5(C) shows a differential pre-amplifier to an ADC. The difference between L1 and L2 is evaluated. The input switches i.e. the pair S1/S4 as well as the pair S2/S3, are synchronized with the output switches S6 and S7. An offset related to ground is eliminated by this arrangement. The differential output voltage Vout is then processed by e.g. an ADC. In this specific embodiment, the AC signal is applied at FIG. 5(B) terminals A and B, and terminal C is sensed via the sample and hold element.

FIG. 5(A)-(C) illustrate elements of measurement systems that measure a relative change in inductance for differential position sensing, i.e. using a differential approach of two inductors. However, FIG. 5(A)-(C) can also be applied to a measurement system for a single inductor (coil). In order to realize a single coil inductance measurement system, one of the inductors in FIG. 5(C) may be a Gyrator, i.e. the reference element may be preferably realized by a Gyrator, which is an equivalent electronic implementation of an inductor. FIG. 5(D) schematically illustrates an example circuitry of a Gyrator. By modulation of the capacitor C1 and/or the resistor R1, the value of the inductor (inductance), including a series resistance, can be modulated.

It may be noted, before starting the measurement of the VCM inductor, all current flow may be stopped and no remaining current may be in the VCM motor. That is, all the energy stored in the inductors is discharged before measuring the inductors (inductance). To speed up this process, the driving terminals of the VCM have to be brought in a state that allows increased discharge voltage via these terminals that the stored energy can be quickly discharged. E.g. the terminals might be switched to a high ohmic state and the energy might be discharged via the protection diodes to the supply rails. Since the electronic speed is much faster than the mechanical one, the VCM remains in the given position during this measuring time. In real implementations, the inductor (i.e. the coil) may be the moving part and the iron may be stationary or the iron may be the moving part and the inductor may be stationary. As mentioned above, the value of the inductance changes with the movement. For the motor, the polarity of the inductor may be kept the same.

Similar to the actuation system 300, the position measuring unit of the actuation system 500 measures the inductance of the electric coil 503 (i.e. the differential inductance ΔL of the partial coils 503-1 and 503-2) and determines the position of the electric coil 503 based on the determined differential inductance to provide the position feedback signal. The position feedback signal may thus contain information of the position of the coil 503. The actuation system 500 further includes a control unit (not shown in FIG. 5) for closed loop control of the position of the optical system based on a target position and the position feedback signal. Also, the control unit can be used for generating a drive signal for the electric coil 503. The coil 503 is supplied with current for its movement by the drive signal. Thus, position sensing can be achieved via the differential-position-depending modulation of VCM coil inductance.

The arrangement of FIG. 5(A) is based on the basic arrangement of FIG. 3. That is, one can also realize the differential position sensing by adding another electric coil to the arrangement of the embodiment FIG. 3. In such case, the voice coil motor further includes another electric coil, and the position measuring unit measures a differential inductance between the electric coil (corresponding to 503-1) and the another electric coil (corresponding to 503-2) and determines a relative position between the electric coil and the ferromagnetic element based on the determined differential inductance.

As such, by means of differential measurement of the relative position depending on the inductance related to the individual coil sections, the actual/current relative coil position to the stationary VCM elements (e.g. the magnet 502, the ferromagnetic element 506, etc.) can be identified. Since the partial coils 503-1(L1) and 503-2 (L2) can be more or less overlapped by the stationary ferromagnetic material (e.g. soft iron) during the coil movement, their value (inductance) changes differentially, and this inductance difference allows the identification of the relative position of the coil.

Due to the differential measurement approach, residual speed of the coil (under homogeneous permanent magnetic field) should not impact the result of the position evaluation as long as the coil is discharged prior to measurement. Also, a discharge of the inductors prior to the evaluation may not be necessary as far as a residual speed of the coil can be excluded, because the residual speed causes a DC offset (that can be filtered out though). This is because a change in differential inductance under a load current leads to a differential voltage at the coil terminals.

It is noted that the VCM actuator described in embodiments FIG. 3 and FIG. 5(A) is not a spring-preloaded actuator. However, similar arrangements may be applicable, without limitations, to a spring-preloaded actuator. A spring-preloaded actuator usually does not require the position sensing means as described herein, it may be combined with the disclosed principles. Furthermore, although the above-described embodiments refer the coil of VCM as the moving part, the moving parts and the stationary parts of the above-described embodiments are exchangeable, i.e. they can be exchanged without changing the general system functionality.

FIG. 6(A) schematically illustrates an arrangement of an actuation system for an optical system with position sensing according to embodiments of the disclosure. The actuation system 600 comprises a voice coil motor (VCM) for actuating the optical system and may be referred as a VCM actuator. The voice coil motor includes at least one magnet 602 (which can be, e.g. a permanent magnet) and an electric coil 603. Similar to the actuation system 300, 500, the actuation system 600 also includes a control unit (not shown in FIG. 6(A)) for closed loop control of the position of the optical system based on a target position and a position feedback signal. The control unit can also be used for generating a drive signal for the electric coil. The coil 603 is supplied with current for its movement by the drive signal. Due to the current applied to the coil 603, the coil can move in the magnetic field of the magnet 602 along the direction as indicated by the arrow 604. The actuation system 600 also includes a position-measuring unit (not shown in FIG. 6(A)) for measuring the position of the electric coil and providing the position feedback signal. According to the embodiment, the actuation system 600 further comprises an excitation unit (not shown) for generating a high frequency AC excitation signal that is superimposed on the drive signal. In particular, the position-measuring unit measures the Back-EMF of the coil caused by the excitation signal, and determines the position of the electric coil based on the measured Back-EMF.

In this embodiment, it is assumed that the relative position (e.g. the overlap) between the moveable coil 603 and the static permanent magnetic field caused by the magnet 602 changes with the excursion of the coil (together with the lens barrel) arrangement. In contrast to foregoing discussed embodiments of FIG. 3 and FIG. 5, the position measurement is based on a change in the back-electromotive-force (Back-EMF) voltage. In general, the Back-EMF depends on the (induced) magnetic field inside the coil, i.e. the change rate of the magnetic flux enclosed by the coil. In order to generate the Back-EMF, the coil 603 keeps moving during the measurement, which changes the magnetic flux (e.g. the static permanent magnetic field caused by the magnet 602) inside the coil 603. As mentioned above, the coil 603 is supplied with DC current for its movement. To measure the Back-EMF, another coil current component for position measurement is applied AC-wise with subsequently changing polarities. For example, the coil current may comprise a DC component and an AC component, and the DC component may result in a corresponding residual coil speed while the AC component modulates the coil speed. Besides, the Back-EMF may be favorably measured at the AC component zero crossings.

Figure 8:
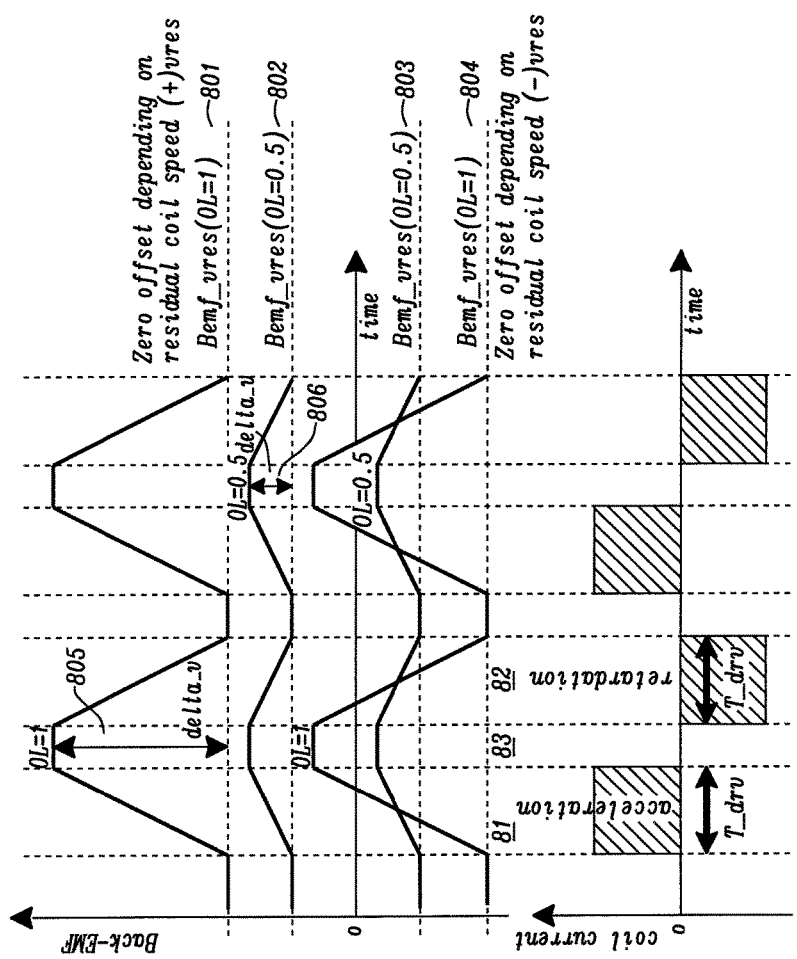
FIG. 8 graphically illustrates variation of the Back-EMF and the coil current over time according to embodiments of the disclosure.

FIG. 8 graphically illustrates variation of the Back-EMF and the coil current over time. The magnitude of the Back-EMF depends on the overlap (OL) between the coil 603 and the magnet 602 (i.e. permanent magnetic field). Furthermore, the Back-EMF depends on the coil speed. For example, lines 801 and 804 represent the Back-EMF variation for an overlap value of 1, and lines 802 and 803 represent the Back-EMF variation for an overlap value of 0.5. The AC component of the coil current shown in the lower part of FIG. 8 has an acceleration region 81 with duration T_drv and a retardation/deceleration region 82 with duration T_drv during which a positive and negative AC current component, respectively, is applied to the coil, causing coil alternating coil acceleration and retardation, thereby corresponding variations in Back-EMF. FIG. 8 shows the coil current as the driving force. In case that the impedance of the coil is dominated by its resistance, the driving voltage would be proportional to the coil current. Driving a current would otherwise have the advantage that it is not impacted by the Back-EMF. FIG. 8 shows further the impact of a residual coil speed on a Back-EMF offset voltage (zero offset) exemplary for 2 idealized overlap (between coil and permanent magnet) cases (OL=0.5 and OL=1).

Lines 801, 802 and lines 803, 804 in FIG. 8 have different offsets caused by different residual speeds which may depend on the DC component of the coil current applied to the coil 603 (and/or the related driving history). On the other hand, the AC component of the coil current applied to the coil 603 results in variations in the Back-EMF, so that the Back-EMF, starting from an offset value, increases linearly up to a maximum value (assuming a constant acceleration of the coil due to the coil current AC component) and then decreases linearly down to the offset value, which reveals first an acceleration behavior for the positive slope and then an deceleration behavior for the negative slope. The difference between the maximum Back-EMF and the offset value is indicated by delta_v (805, 806) in FIG. 8. One can observe that the difference in the Back-EMF (delta_v) depends on the overlap (OL) value, e.g. increases along with the overlap value. Thus, the difference in the Back-EMF 805, 806 indicates the overlap between the coil 603 and the magnet 602, while the Back-EMF offset indicates (with knowledge of the overlap) the residual speed.

As the VCM does not include a spring, there exists ideally no intrinsic mechanic resonance. As such, the Back-EMF (which is proportional to the coil speed) should show its maxima (and minima) at each of the driving current zero crossings, i.e. at the area 83 between acceleration area 81 and retardation 82 caused by the AC driving current component. The movement of the coil during measurement may be small compared to the full operating range of the VCM. Any ongoing (residual) single direction coil movement during measurement may cause a related constant Back-EMF offset. This impact on the position-dependent Back-EMF component can be canceled by evaluating the difference in Back-EMF (delta_v) in subsequent (i.e. positive and negative) coil driving current zero crossings. With knowledge of this differential position-dependent Back-EMF component, and thereby with knowledge of the actual overlap between the coil and the stationary permanent magnets, the Back-EMF offset can be used to measure the residual speed which may be additionally taken into consideration by a controller (i.e. a control unit) to regulate (closed loop) the coil (lens barrel) position.

Besides, the applied AC coil driving current signal for measurement may (due to the mechanic bandwidth of the VCM) not provoke a centering of the coil (to reach maximum overlap). As for the permanent magnets $\mu_r=1$ holds, decentering of the coil does not change the inductance of the coil. To minimize the energy stored within the magnetic field, for $\mu r>1$, the magnetic path in air should otherwise be minimized. This should not be related to the mechanic bandwidth. The AC signal may be in principle applied/overlaid to a driving DC signal (for position changing of the coil). It is noted that the Back-EMF depends proportionally on the overlap between the coil and the static magnetic field. Also, the axial force that changes the position of the coil position depends proportionally on this overlap and therefore also the acceleration of the moving coils. Accordingly, if the VCM system is excited by an AC source for the purpose of position measurement, the Back-EMF may depend on the square of the overlap.

Although the Back-EMF may be measured in a high ohmic state (in case of a relatively small voltage), the driving signals can be in principle (and under consideration of the Back-EMF) a voltage as well, although a voltage source typically has low impedance. This may be disadvantageous for measuring a voltage (depending on the resistance of the Back-EMF source). When a driving voltage signal is used, the AC source should be switched to a high ohmic state to allow measurement of the Back-EMF. As indicated above, the Back-EMF due to residual coil speed (i.e. the Back-EMF offset) may have a linear dependency on the overlap value, while the Back-EMF due to AC-exited coil speed (i.e. the Back-EMF difference (delta_v)) may have a squared dependency on the overlap value. It is further noted that only the part of the inductor, which is covered by the magnetic flux, can generate the Back-EMF and a motor force. The motor may be designed to fit with the electronic design, which can drive the motor to a defined position and also to measure the position continuously.

Accordingly, position sensing can be achieved via a VCM with variable coil to magnetic field overlap (e.g. an overlap between the coil and the magnet). In this embodiment, no additional components are required for position sensing (e.g. no Hall sensor and no additional ferromagnetic material), which simplifies the cost and complexity of the VCM system.

FIG. 6(B) schematically illustrates an equivalent circuit for position sensing in a spring-preloaded system as illustrated in the system shown in FIG. 2(A). The low frequency mechanical resonance is due to the spring as well as the moving mass. The motor design may cause at least one high-frequency mechanical resonance at a frequency above 20 KHz, which may change the frequency over the movement. Normally, a low-frequency mechanical resonance of around 100 Hz appears for such VCM and may be avoided. As described above, the motor may be driven by a current, which has a DC part and an AC part with a high frequency. In the circuit of FIG. 6(B), the DC part of the driving current is denoted as "Motor Driving Stimuli" and the AC part of the driving current is denoted as "Resonance 20 kHz Stimuli". However, the frequency of the "Resonance Stimuli" can be other values. C1 and C2 should model (together with L1 and L2 each) the electrical impact of the two mechanical resonances (e.g. 100 Hz and 20 kHz). The resonance frequency of the mechanical system is e.g. due to nonlinearity in an affiliated spring constant depending on the actual coil position. The driving AC stimulus is e.g., 20 kHz. It is noted that the high-frequency portion may have no influence for the applications (e.g. the positioning of a lens barrel). According to FIG. 6(B), the motor driving stimuli (the drive signal) is the output of the regulation loop (not shown in FIG. 6(B)), and the position of the coil determined based on the Back-EMF measurement is provided for the feedback signal.

For measuring the position of the coil, the amplitude and phase of the Back-EMF may be measured. Evaluation of the Back-EMF amplitude and phase allows for deriving the difference between the driving AC frequency and the (coil position depending) resonance frequency that is a measure for the actual position of the coil.

The Back-EMF measurement may be synchronized with the driving AC stimuli and with switches S1, S2. In detail, switch S1 may be in off-state and switch S2 may be in on-state during the measurement, so that the position measurement using Back-EMF can be achieved at e.g. the zero crossings of the AC stimuli and without impact of an overlain driving signal. After the measurement, switch S1 may be return to on-state and switch S2 may be return to off-state. Accordingly, the phase and the amplitude of the Back-EMF can be detected. The Back-EMF frequency may be much higher than the driving frequency. The mechanical resonance may change its frequency in respect of the moving position.

S1 should be opened in case that the stimulating sources are of a low ohmic type (i.e. as voltage sources) which then may require discharge of the coil prior to measurements. The Back-EMF will have the same frequency than the stimuli, but amplitude and phase (compared to the stimulating signal) provide a measure for the actual coil position (as noted above). If S1 remains closed during the measurement and probably with the driving AC signal persisting, the evaluation of the difference in phase can—due to the relatively low Back-EMF amplitude—require high-resolution instrumentation. S2 represents a sampling element (input to e.g. an ADC).

Figure 7:
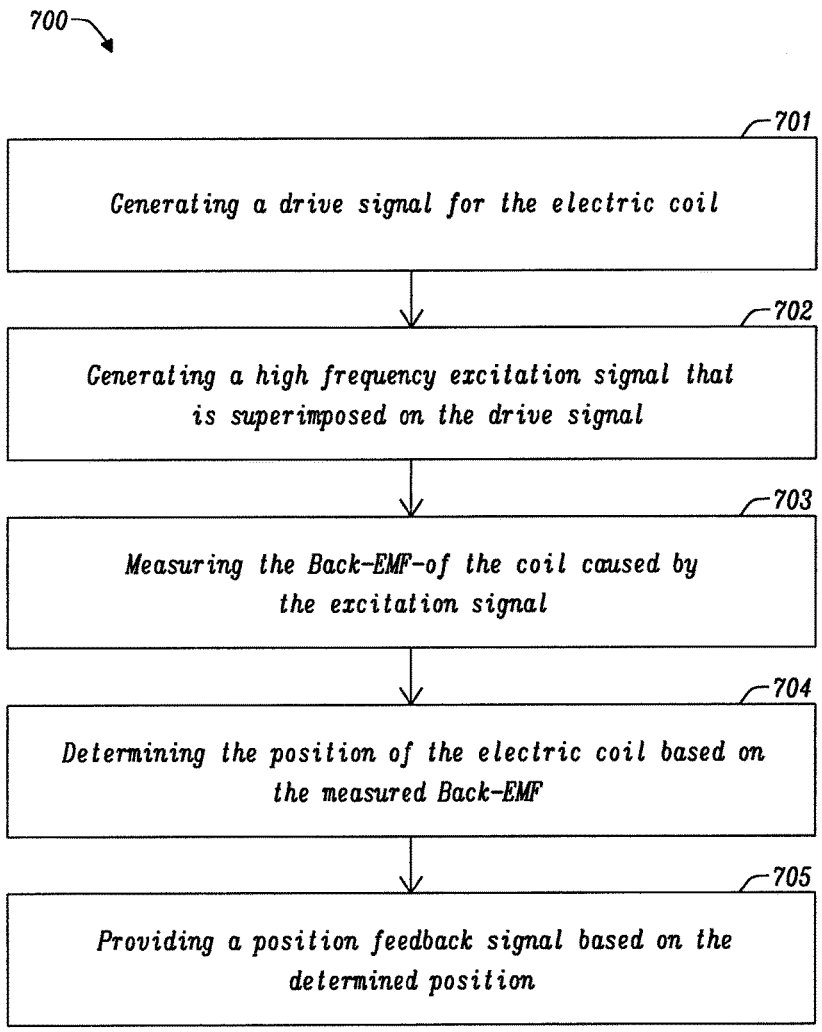
FIG. 7 schematically illustrates a flow diagram of an example method for operating the actuation system of FIG. 6(A) according to embodiments of the disclosure.

Evaluation of the Back-EMF might require several samples to evaluate (including intra- and extrapolation) amplitude and phase. Thus, evaluation is preferably done in the vicinity of the excitation signal zero crossings (i.e. the excitation signal might be shaped in a way to allow an extended zero crossing region). Back-EMF may also be evaluated by measuring a phase shift between excitation current and resulting voltage. FIG. 7 schematically illustrates a flow diagram of an example method 700 for operating the actuation system 600 according to embodiments of the disclosure. The method 700 comprises generating (step 701) a drive signal for the electric coil. The method 700 comprises generating (step 702) a high frequency excitation signal that is superimposed on the drive signal. The method further comprises measuring (step 703) the Back-EMF of the coil caused by the excitation signal as well as by the driving signal. Furthermore, the method comprises determining (step 704) the position of the electric coil based on the measured Back-EMF. The method also comprises providing (step 705) a position feedback signal based on the determined position.

Figure 9:
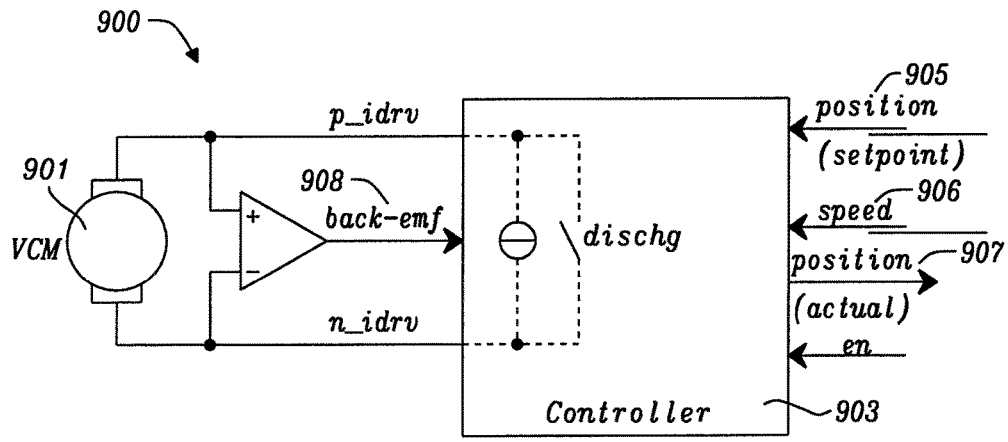
FIG. 9 schematically illustrates an actuation system with inherent position sensor according to embodiments of the disclosure.

FIG. 9 schematically illustrates an actuation system with inherent position sensor according to embodiments of the disclosure. The actuation system 900 includes a VCM unit 901 and a controller 903 for realizing the Back-EMF sensing circuitry as described e.g. in the embodiment of FIG. 6. It is noted that the controller 903 in FIG. 9 can be used as the control unit for the embodying arrangement of FIG. 6. As mentioned above, Back-EMF sensing may include the functionalities of (i) measurement of difference in Back-EMF at subsequent driving coil current zero crossings to assess the overlap between the coil and the magnetic field and thereby the coil position, (ii) measurement of absolute Back-EMF (which is optional) to assess the residual coil speed with the knowledge of the measured difference in Back-EMF and/or the measured overlap and (iii) means for calibration and correction, as e.g. the overlap may not result in a linear increase in magnetic field. In some embodiments, the controller 903 may perform the position measuring function or comprise a position-measuring unit. In such case, the controller 903 may receive the measured Back-EMF directly as indicated by the arrow 908. Alternatively, the position measurement function may be external to controller 903.

It is noted that the Back-EMF may be preferably measured with the coil (inductance) discharged (i.e. at zero coil current) between the terminals of the coil, as illustrated in, e.g. FIG. 6(B). The input of the controller 903 may be provided with (apart from calibration/correction data) the target coil position 905 (set point) and the coil speed 906 (optionally). Actuating variable is preferably VCM coil current. The measured Back-EMF of the VCM is sensed and processed (e.g. by the position measuring unit inside the controller 903 or through a position measuring function performed by the controller 903) to generate the instantaneous position and optional speed values, which are then considered in a closed loop control algorithm performed by the controller 903. The determined actual position value 907 may be output from the controller for other purposes in the VCM system. The controller 903 then generates a drive signal (potentially including overlain AC signal) and provides the drive signal at its output (p_idrv, n_idrv) for the electric coil. The discharge switch allows discharging the VCM coil prior to Back-EMF measurement (e.g. at the zero crossings of the AC signal). Finally, an enable signal en is shown in FIG. 9 to enable the controller 903.

The proposed sensing technique uses the effect of a high frequency modulation of a resonant circuitry. It is noted that the sensing characteristics within the motor (VCM) may be a nonlinear function. The motor and the employed electronic components may be adjusted for determining the position. The control algorithm may also include nonlinearity compensation and calibration for calibrating the total maximum movements. As indicated above, the moving information can be a moving distance and/or moving speed. It is further appreciated that the moving part (e.g. inductor) and the stationary part (e.g. magnet) can be exchanged.

Calibration could be done by evaluating the position of the coil corresponding to the Back-EMF amplitude and phase and storing such values (that may be interpolated in the following) within a table.

Figure 10:
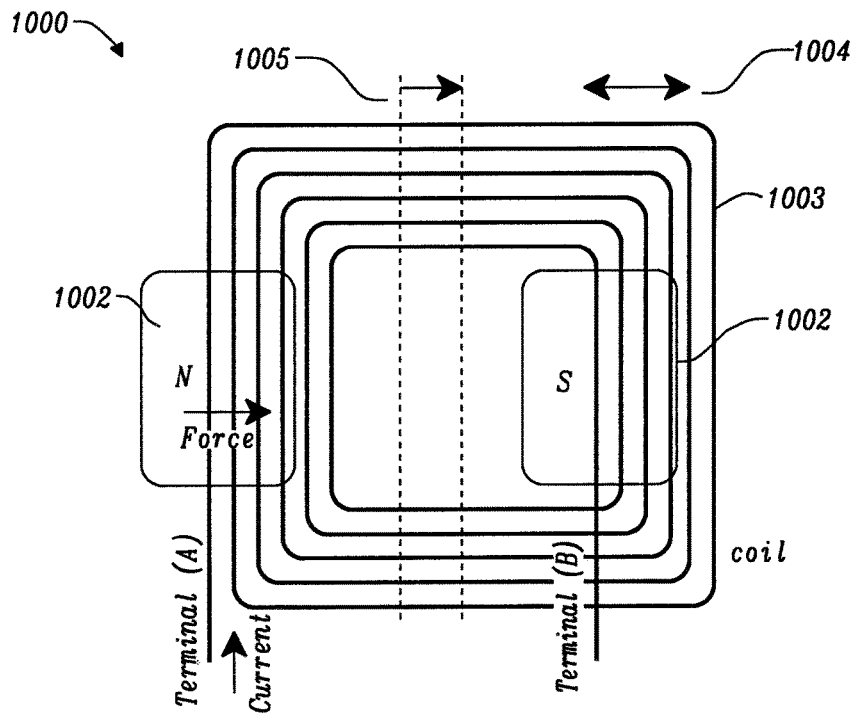
FIG. 10 schematically illustrates an arrangement of a linear-motor-like actuation system with position sensing via a VCM with variable coil-magnet overlap according to embodiments of the disclosure.

It is to be noted that the above embodiments shown in FIGS. 3, 5, 6 can also be implemented with a linear motor. FIG. 10 schematically illustrates an arrangement of a linear-motor-like actuation system with position sensing via a VCM with variable coil-magnet overlap according to embodiments of the disclosure. Similar to the arrangement of FIG. 6(A), the VCM of the actuation system 1000 comprises a magnet 1002 (e.g. a permanent magnet) and an electric coil 1003. According to FIG. 10, the coil 1003 has N=6 windings that are laid-out approximately flat within a plane. Due to the current applied to the coil 1003, the coil can move in the magnetic field of the magnet 1002 along the direction as indicated by the arrow 1004, causing a coil displacement 1005. It is appreciated that FIG. 10 shows a functional equivalent example of FIG. 6(A) with a linear-motor-like actuator realized instead. Thus, the functional descriptions given for FIG. 6 (e.g. the Back-EMF sensing, position sensing with variable overlap between the coil and the magnetic field, etc.) are also applicable to FIG. 10. In other words, the position of the coil 1003 may be determined based on the overlap between the coil and the magnetic field, which can be obtained by measuring the Back-EMF. Furthermore, such a linear-motor-like actuator as illustrated in FIG. 10 can also be applied to the embodiments of FIG. 3 and FIG. 5 with similar, equivalent realizations. It is further noted that a controller similar to the controller 903 in FIG. 9 can be also used for the embodying arrangements of FIG. 3 and FIG. 5 and FIG. 10, where the coil position is determined by measuring the coil inductance.

Accordingly, the disclosure provides an actuation system/method using the existing parts of the VCM itself for position sensing (e.g. by using ferromagnetic material or measuring the Back-EMF for position sensing as an inherent position sensor). As such, a Hall sensor can be omitted in the system. More specifically, the driven coil of the VCM can replace the Hall Sensor, thereby enabling fast, efficient and accurate position control for multipurpose applications. That is, high performance VCM systems can be achieved without using Hall sensors for position feedback. As such, the proposed sensing technique can make any additional magnets and Hall sensors for position sensing dispensable, which promises reduced system costs and increased robustness.

In particular, using the proposed position sensing technique, a VCM-based AF camera module can achieve equivalent performance without applying a position sensor (Hall sensor) and superior performance compared to a spring-preload arrangement. Thus, elements and connections in/between modules can be reduced, and thereby the cost, but the system can stay robust and can be more easily assembled.

All figures provided in this disclosure are exemplary for description of the addressed components, features and functionalities. They are not the result of any system optimization that remains in the competency of the VCM/module manufactures.

It should be noted that the description and drawings merely illustrate the principles of the proposed methods and systems. Those skilled in the art will be able to implement various arrangements that, although not explicitly described or shown herein, embody the principles of the invention and are included within its spirit and scope.

Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. An actuation system, comprising:
a voice coil motor comprising at least one magnet and an electric coil;
a position-measuring unit for measuring a position of the electric coil and providing a position feedback signal; and
a control unit for closed loop control of a position of the electric coil based on a target position and the position feedback signal, and for generating a drive signal for moving the electric coil,
wherein a ferromagnetic element is arranged in proximity to the electric coil so that an inductance of the electric coil depends on its position, and the position measuring unit measures the inductance of the electric coil and determines the position of the electric coil based on the measured inductance.

2. The system of claim 1, wherein the inductance of the electric coil varies based on a relative position between the electric coil and the ferromagnetic element.

3. The system of claim 1, wherein the inductance of the electric coil is determined based on a measured voltage and/or a measured current.

4. The system of claim 1, further comprising a summation unit for adding an AC signal to the drive signal for measuring the inductance of the electric coil, wherein the AC signal has a relatively higher frequency than a frequency of the drive signal for the electric coil.

5. The system of claim 4, wherein the electric coil is discharged prior to measuring the inductance of the electric coil.

6. The system of claim 1, the voice coil motor further comprising another electric coil, wherein the position-measuring unit measures a differential inductance between the electric coil and the another electric coil and determines a relative position between the electric coil and the ferromagnetic element based on the measured differential inductance.

7. The system of claim 6, wherein the position-measuring unit comprises a Maxwell bridge circuitry.

8. The system of claim 6, wherein one of the electric coil and another electric coil comprises a Gyrator function.

9. An actuation system for an optical system, comprising:
a voice coil motor comprising a magnet and an electric coil;
a position-measuring unit for measuring a position of the electric coil and providing a position feedback signal;
a control unit for closed loop control of a position of the electric coil based on a target position and the position feedback signal, and for generating a drive signal for moving the electric coil; and
an excitation unit for generating a high frequency excitation signal that is superimposed on the drive signal,
wherein the position-measuring unit measures a Back-EMF of the electric coil caused by the excitation signal, and determines the position of the electric coil based on the measured Back-EMF.

10. The system of claim 9, the voice coil motor further comprising at least one permanent magnet causing a static permanent magnetic field, wherein the Back-EMF of the electric coil varies based on a relative position between the electric coil and the static permanent magnetic field.

11. The system of claim 9, wherein the electric coil is discharged prior to the measured Back-EMF of the electric coil.

12. The system of claim 11, wherein the position measuring unit measures the Back-EMF of the electric coil at subsequent zero crossings of the excitation signal for the electric coil to obtain a relative position for a position determination.

13. The system of claim 9, wherein the position-measuring unit measures a Back-EMF offset, wherein a residual coil speed is further obtained based on the Back-EMF offset.

14. The system of claim 1, further comprising a calibrating unit to obtain linear positioning.

15. A method for actuating a voice coil motor, the voice coil motor having a magnet and an electric coil, the method comprising:
measuring an inductance of the electric coil;
determining a position of the electric coil based on the measured inductance;
providing a position feedback signal based on the determined position;
controlling a position of the electrical system based on a target position and the position feedback signal; and
generating a drive signal for moving the electric coil.

16. The method of claim 15, the inductance of the electric coil depending on its position, wherein the inductance of the electric coil varies based on a relative position between the electric coil and a ferromagnetic element.

17. The method of claim 15, further comprising measuring a voltage and/or a current associated with the electric coil, wherein the inductance of the electric coil is determined based on the measured voltage and/or the measured current.

18. The method of claim 15, wherein the drive signal for the electric coil has a low frequency, further comprising adding an AC signal to the drive signal for measuring the inductance of the electric coil, wherein the AC signal has a relatively higher frequency than a frequency of the drive signal for the electric coil.

19. The method of claim 15, further comprising discharging the electric coil prior to measuring the inductance of the electric coil.

20. The method of claim 15, wherein the voice coil motor further comprises another electric coil, further comprising:
measuring a differential inductance between the electric coil and another electric coil; and
determining a relative position between the electric coil and a ferromagnetic element based on the measured differential inductance.

21. A method for actuating a voice coil motor, the voice coil motor having a magnet and an electric coil, the method comprising:
generating a drive signal for moving the electric coil;
generating a high frequency excitation signal that is superimposed on the drive signal;
measuring a Back-EMF of the electric coil caused by an excitation signal;
determining a position of the electric coil based on the measured Back-EMF;
providing a position feedback signal based on the determined position; and
controlling a position of the electric coil based on a target position and the position feedback signal.

22. The method of claim 21, wherein the Back-EMF of the electric coil varies based on a relative position between the electric coil and a static permanent magnetic field caused by a permanent magnet of the voice coil motor.

23. The method of claim 21, further comprising discharging the electric coil prior to measuring the Back-EMF of the coil.

24. The method of claim 23, wherein a current of the drive signal for the electric coil reaches zero when the electric coil is discharged, further comprising measuring a difference in the Back-EMF of the coil at subsequent current zero crossings of the excitation signal for the electric coil to obtain the relative position for a position determination.

25. The method of claim 21, further comprising measuring a Back-EMF offset and obtaining a residual coil speed based on the Back-EMF offset.

* * * * *

UNITED STATES PATENT AND TRADEMARK OFFICE
CERTIFICATE OF CORRECTION

PATENT NO. : 10,439,528 B2
APPLICATION NO. : 16/104494
DATED : October 8, 2019
INVENTOR(S) : Horst Knoedgen and Horst Schleifer Page 1 of 1

It is certified that error appears in the above-identified patent and that said Letters Patent is hereby corrected as shown below:

On the Title Page

In the Inventors (72), delete second Inventor address "Kircheim unter Teck (DE)" and replace with -- Kirchheim unter Teck (DE) --

Signed and Sealed this
Twenty-fourth Day of November, 2020

Andrei Iancu
*Director of the United States Patent and Trademark Office*